United States Patent

Fukaya et al.

[11] Patent Number: 5,820,515
[45] Date of Patent: Oct. 13, 1998

[54] HILL HOLDING BRAKE PRESSURE AS A FUNCTION OF HILL GRADIENT DETECTED AS A FUNCTION OF ACCELERATION IN A CONTROL SYSTEM FOR AUTOMATIC TRANSMISSION

[75] Inventors: Naoyuki Fukaya; Koji Noda; Takahiro Yamashita, all of Anjo, Japan

[73] Assignee: Aisin Aw Co., Ltd., Anjo, Japan

[21] Appl. No.: 824,345

[22] Filed: Mar. 26, 1997

[30] Foreign Application Priority Data

Mar. 27, 1996 [JP] Japan .................................. 8-095911

[51] Int. Cl.⁶ .................................................. F16H 61/20
[52] U.S. Cl. ............................. 477/92; 477/93; 477/95; 477/120; 477/901
[58] Field of Search ................................ 477/79, 80, 92, 477/93, 94, 95, 120, 901

[56] References Cited

U.S. PATENT DOCUMENTS

| | | |
|---|---|---|
| 4,648,289 | 3/1987 | Kubo et al. |
| 4,650,046 | 3/1987 | Parsons . |
| 4,879,925 | 11/1989 | Taga et al. . |
| 5,231,897 | 8/1993 | Morita ........................................ 477/120 |
| 5,241,476 | 8/1993 | Benford et al. ...................... 477/120 X |
| 5,598,335 | 1/1997 | You ...................................... 477/120 X |
| 5,665,995 | 9/1997 | Kondo et al. ....................... 477/901 X |
| 5,669,847 | 9/1997 | Kashiwabara ....................... 477/901 X |
| 5,692,990 | 12/1997 | Tsukamoto et al. ................ 477/901 X |
| 5,728,026 | 3/1998 | Sakaguchi et al. ................. 477/120 X |

FOREIGN PATENT DOCUMENTS

| | | |
|---|---|---|
| 0 681 123 A2 | 11/1995 | European Pat. Off. . |
| 0 742 394 A2 | 11/1996 | European Pat. Off. . |
| A-59-29861 | 2/1984 | Japan . |
| A-7-301330 | 11/1995 | Japan . |

Primary Examiner—Khoi Q. Ta
Attorney, Agent, or Firm—Oliff & Berridge, PLC

[57] ABSTRACT

A control system for an automatic transmission having a hydraulic power transmission for transmitting the rotation of an engine to a gear shifter; a clutch to be applied, when a forward drive range is selected, for connecting the hydraulic power transmission and the gear shifter to one another; a one-way clutch to be locked, when the clutch is applied, for establishing a first forward speed of the gear shifter; a brake for locking the one-way clutch, when applied, to block the backward rotation of the output shaft of the gear shifter; a first hydraulic servo for applying the clutch when fed with an oil pressure; a second hydraulic servo for applying the brake when fed with an oil pressure; a stopping state detector that detects the stopping state of a vehicle by determining the vehicle speed is substantially 0, the accelerator pedal is in a released state and the foot brake pedal is depressed; a gradient detector that detects the gradient load of an uphill, as applied to the vehicle; and a controller that controls the oil pressure to be fed to the first and second hydraulic servos on the basis of the signals from the stopping state detector and the gradient detector. The controller includes a decision maker that determines whether the road is uphill, on the basis of the signal from the gradient detector; a pressure reducing device that reduces the oil pressure to be fed to the first hydraulic servo, to bring the clutch into a substantially released state; a feed device that feeds an oil pressure, as regulated on the basis of the gradient detector, to the second hydraulic servo, to apply the brake at an engaging extent according to the gradient load; and a device for executing the reduction of the feed oil pressure to the first hydraulic servo by the pressure reducer and the feed of the regulated oil pressure to the second hydraulic servo by the oil pressure feeder, if it is detected by the stopping state detector that the vehicle is in the stopping state and if it is determined by the decision maker that the road is uphill.

17 Claims, 12 Drawing Sheets

FIG. 3

|  |  | Solenoid | | | | Clutch | | | | Brake | | O.W.C. | |
|---|---|---|---|---|---|---|---|---|---|---|---|---|---|
|  |  | S1 | S2 | S3 | SL | C0 | C1 | C2 | C3 | B1 | B2 | F0 | F1 |
| P |  | ○ | × | × | × | × | × | × | ○ | × | × | × | × |
| R | V≤7 | ○ | × | × | × | × | × | ○ | ○ | × | ○ | × | × |
|   | V>7 | × | ○ | × | × | × | × | ○ | ○ | × | × | × | × |
| N |  | ○ | × | × | × | × | × | × | ○ | × | × | × | × |
| D | 1ST | ○ | × | × | × | × | ○ | × | ○ | × | (○) | ○ | ○ |
|   | 2ND | ○ | ○ | × | × | × | ○ | × | ○ | ○ | × | ○ | × |
|   | N | ○ | ○ | ○ | △ | × | △ | × | ○ | △ | × | ○ | × |
|   | 3RD | × | ○ | × | ◎ | ○ | ○ | × | ○ | ◎ | × | ○ | × |
|   | 4TH | × | × | × | ◎ | ○ | ○ | × | × | ○ | × | × | × |
| Remarks | ○ | ON | | | | Applied | | | | | | Locked | |
|   | × | OFF | | | | Released | | | | | | Free | |
|   | ◎ | ON: Lockup ON OFF: Lockup OFF | | | | B1 Release by B-1 Release Pressure | | | | | | | |
|   | △ |  | | | | Neutral Control | | | | | | | |
|   | (○) |  | | | | Applied at Engine Brake | | | | | | | |

FIG. 6

E/G TORQUE MAP

| E/G RPM \ THROTTLE OPEN(%) | 0 | 11.1 | 16.7 | 22.2 | |
|---|---|---|---|---|---|
| 1000 | 5 | 70 | 100 | 115 | |
| 1500 | 0 | 60 | 95 | 120 | |
| 2000 | 0 | 55 | 85 | 115 | |
| 2500 | 0 | 40 | 75 | 110 | |
| 3000 | 0 | 35 | 50 | 90 | |
| | | | | | |

FIG. 7

TORQUE RATIO Map

| SPEED RATIO | TORQUE RATIO |
|---|---|
| 0 | 2.5 |
| 0.1 | 2.0 |
| 0.2 | 1.9 |
| 0.3 | 1.8 |
| 0.4 | 1.6 |
| 0.5 | 1.5 |
| 0.6 | 1.3 |
| 0.7 | 1.2 |
| 0.8 | 1.0 |
| 0.9 | 1.0 |
| 1.00 | 1.0 |

FIG. 8

RUN RESISTANCE MAP

| VEHICLE SPEED | 0 | 10 | 20 | 30 | 40 | 50 | 60 | 70 | 80 | 90 | 100 |
|---|---|---|---|---|---|---|---|---|---|---|---|
| RUN RESISTANCE FLAT ROAD | 265 | 270 | 280 | 300 | 330 | 360 | 400 | 460 | 520 | 580 | 660 |

FIG. 9

LOSS MAP

| GEAR RATIO | 1st | 2nd | 3rd | 4th |
|---|---|---|---|---|
| GEAR LOSS | 39.0 | 35.5 | 41.5 | 45.5 |

FIG. 10

BASE OFFSET MAP

| GEAR RATIO \ THROTTLE OPEN (%) | 0 | 10 | 20 | 30 | 40 | 50 |
|---|---|---|---|---|---|---|
| 2nd | 0 | 0 | 0 | 0.2 | 0.3 | 0.4 |
| 3rd | 0 | 0 | 0 | 0.1 | 0.2 | 0.3 |
| 4th | 0 | 0 | 0 | 0.1 | 0.2 | 0.2 |

HILL HOLDING BRAKE PRESSURE AS A FUNCTION OF HILL GRADIENT DETECTED AS A FUNCTION OF ACCELERATION IN A CONTROL SYSTEM FOR AUTOMATIC TRANSMISSION

BACKGROUND OF THE INVENTION

1. Field of the Invention

The invention relates to a control system for an automatic transmission and, more particularly, to a control system for performing a neutral control and a hill hold control of a gear shifter.

2. Related Art

An automatic transmission comprises a hydraulic power transmission and a gear shifter. When a drive range is selected, the hydraulic power transmission takes a rotation transmitting state through a fluid, and the gear shifter takes a rotation transmitting state in which it is mechanically coupled. If the vehicle is stopped in these states with its wheels being braked, the gear shifter is stopped in the rotation transmitting state by the braking force so that the rotation of the engine is released by the slip of the fluid in the hydraulic power transmission thereby causing a power loss corresponding to the aforementioned fluid slip. In the drive range, therefore, there has been performed the so-called "neutral control", in which the clutch in the gear shifter is released during the stop of the vehicle to the state (as will be called the "substantially released state") just before the application, as prepared for a next start, so that the gear shifter itself is brought into the power OFF state to reduce the engine load for causing the fluid slip in the hydraulic power transmission, thereby preventing the power loss and improving the mileage.

In the case of the neutral control, the creep force, as caused by the power transmission through the fluid in the hydraulic power transmission, cannot be expected to cause a phenomenon that the vehicle is moved backward when the braking force of a brake unit for stopping the vehicle on an uphill or the like is lowered. In order to prevent this phenomenon, therefore, there is also performed the so-called "hill hold control", in which the backward movement of the vehicle is blocked by preventing the backward rotation of the gear shifter by the wheel drive. This control establishes a state in which the backward rotation of the gear shifter is blocked, by applying a specific brake in the gear shifter and by locking a one-way clutch.

An example for executing the neutral control and the hill hold control together is disclosed in Japanese Patent Laid-Open No. 29861/1984. According to this technique, there are operated: a vehicle speed sensor for detecting that the vehicle speed is no more than a set value and issuing an output; a stopping operation detecting sensor for detecting the operation of a vehicle stopping device and issuing an output; and electromagnetic means for releasing an input clutch to apply the brake in response to the output signal of a control by deciding the condition that both the outputs of the two sensors are issued. In other words, according to this technique, in order to perform the hill hold control at the neutral control time, these two controls are started when the three signals of the operation of the brake unit, the release of the accelerator pedal and the vehicle speed of substantially 0 are all ON.

When, however, the vehicle is stopped on a steep uphill to cause the aforementioned neutral control and hill hold control, the force for applying the hill hold brake may become insufficient. Then, there arises a problem that the brake slips to cause the jitter or shudder (vibration), in which the friction member repeats applications and releases for an extremely short period. On a gentle uphill, on the other hand, there arises a problem that a shock is caused by the abrupt application of the hill hold brake. This situation is invited by the fact that the force for applying the hill hold brake is constant at all times. It is, therefore, one method that the hill hold control is performed within such a range of gradient as to raise no problem by the aforementioned constant application force. In this case, the effect to improve the mileage by the neutral control is reduced.

SUMMARY OF THE INVENTION

It is, therefore, a first object of the invention to provide a control system for an automatic transmission, which is enabled to sufficiently exhibit the effect of improving the mileage according to the neutral control by performing the neutral control on an uphill, by controlling the application force of the hill hold brake according to the backward force resulting from the gradient, and by performing the hill hold control to prevent the backward movement of the vehicle irrespective of the degree of gradient.

Moreover, the invention has a second object to generate a hill hold force conforming to the gradient load of an uphill in the aforementioned control system by controlling an oil pressure.

Next, the invention has a third object to make the hill hold control possible without any delay in the aforementioned control system by detecting the gradient load of the uphill before the vehicle stops.

Moreover, the invention has a fourth object to optimize the preceding detection timing of the gradient load.

Moreover, the invention has a fifth object to detect the aforementioned-preceding gradient load as a value suited for the hold including the various other loads of the vehicle at that time.

Incidentally, when the neutral control and the hill hold control are simultaneously started, the application of the brake for the hill hold control is delayed by the piston stroke, but the release of the clutch is faster to cause a state in which both the resisting force to the backward movement of the vehicle, by the hill hold control, and the creep force, by the application of the clutch, may not act to move the vehicle backward. Therefore, the invention has a sixth object to prevent the backward movement of the vehicle due to the neutral control by causing the hill hold control so as to prevent the backward movement of the vehicle according to the gradient load of the uphill.

Moreover, the invention has a seventh object to minimize the shortening of the neutral control period due to the precedence of the aforementioned hill hold control.

Finally, the invention has an eighth object to eliminate the provision of a solenoid valve, as dedicated to the aforementioned hill hold control.

In order to achieve the above-specified first object, according to the invention, there is provided a control system for an automatic transmission comprising a hydraulic power transmission for transmitting the rotation of an engine to a gear shifter; a clutch to be applied, when a forward drive range is selected, for connecting the hydraulic power transmission and the gear shifter to each other; a one-way clutch to be locked, when the clutch is applied, for establishing a first forward speed of the gear shifter; a brake for locking the one-way clutch, when applied, to block the backward rotation of the output shaft of the gear shifter; a first hydraulic servo for applying the clutch when fed with an oil pressure; a second hydraulic servo for applying the brake when fed with an oil pressure; stopping state detecting means for detecting the stopping state of a vehicle in terms of the facts that the vehicle speed is substantially 0, that the accelerator pedal is in a released state and that the foot brake pedal is depressed; gradient detecting means for detecting the gradient load of an uphill, as applied to the vehicle; and control means for controlling the oil pressure to be fed to the first and second hydraulic servos on the basis of the signals from the stopping state detecting means and the gradient detecting means, wherein the control means includes: decide means for deciding whether the road is uphill, on the basis of the signal from the gradient detecting means; pressure reducing means for reducing the oil pressure to be fed to the first hydraulic servo, to bring the clutch into a substantially released state; feed means for feeding an oil pressure, as regulated on the basis of the gradient detecting means, to the second hydraulic servo, to apply the brake at an engaging extent according to the gradient load; and execute means for executing the reduction of the feed oil pressure to the first hydraulic servo by the pressure reducing means and the feed of the regulated oil pressure to the second hydraulic servo by the feed means, if it is detected by the stopping state detecting means that the vehicle is in the stopping state and if it is decided by the decide means that the road is uphill.

Next, in order to achieve the above-specified second object, the feed means has pressure regulating means for raising the feed oil pressure higher for the higher gradient load, as detected by the gradient detecting means.

In order to achieve the above-specified third object, moreover, the gradient detecting means detects the gradient load by comparing an actual acceleration while the vehicle is running and a reference acceleration, as computed on the basis of the input torque to the gear shifter.

In order to achieve the above-specified fourth object, on the other hand, the gradient detecting means detects the gradient load if the gear shifter is in the forward range, if not being shifted and if the foot brake pedal is not depressed.

In order to achieve the above-specified fifth object, moreover, the reference acceleration is computed on the basis of the ideal acceleration of the vehicle, as achieved on a flat road from the input torque to the gear shifter, the gear stage of the gear shifter, and the vehicle speed.

In order to achieve the above-specified sixth object, moreover, the execute means starts the feed of the oil pressure to the second hydraulic servo by the feed means and the reduction of the feed oil pressure to the first hydraulic servo by the pressure reducing means, if it is decided by the stopping state detecting means that the vehicle is in the stopped state and if it is decided by the decide means that the road is uphill.

In order to achieve the above-specified seventh object, moreover, the predetermined period continues till at least the application of the brake ends.

In order to achieve the above-specified eighth object, on the other hand, the feed means has pressure regulating means for regulating the feed oil pressure to the second hydraulic servo by a lockup controlling solenoid valve of the gear shifter.

According to the disclosed structure, the feed of the oil pressure to the hydraulic servo for applying the hill hold brake is controlled according to the gradient load of the hill, as detected by the gradient detecting means, so that the hill hold brake is applied at an engaging extent according to the gradient load to effect the hill hold without either jitter or any engaging shock. As a result, the neutral control on the uphill can be executed without any trouble irrespective of the gradient of the slope thereby to maximize the improvement in the mileage of the neutral control.

If, moreover, the feed oil pressure is raised according to the increase in the gradient load by the pressure regulating means, as in the disclosed structure, a constant hill hold force can be generated by the control of the oil pressure irrespective of the gradient of the uphill.

In the structure, on the other hand, the gradient load of the road surface is detected during the running of the vehicle so that the gradient load of the board surface can be acquired to reliably prevent the jitter or application shock of the hill hold brake, as might otherwise be caused by the delay in the hill hold control.

If, moreover, the gradient load is detected as in the disclosed structure, it can be detected more accurately by optimizing the detection timing so that the degree of engagement of the hill hold brake can be made more practical.

In the disclosed structure, on the other hand, at the time of computing the reference acceleration, the vehicle speed, as detected, is influenced by the input torque to the gear shifter, the gear stage of the gear shifter, and the running resistance, such as air resistance so that the ideal acceleration matching the state of the vehicle can be computed.

In the disclosed structure, on the other hand, the hill hold control is performed in precedence in the case of an uphill, and the two controls are simultaneously performed when the gradient is so low that the vehicle is not moved backward. Thus, when the neutral control and the hill hold control are simultaneously started, the brake application for the hill hold control is delayed by the piston stroke, and the release of the clutch can be precedent to avoid the state in which both the resisting force to the backward movement of the vehicle by the hill hold control and the creep force by the application of the clutch do not act. According to the disclosed structure, therefore, the timing for no neutral control can be minimized to maximize the effect of improving the mileage by the neutral control.

In the disclosed structure, on the other hand, the neutral control period under the hill hold control can be elongated with the effect of improving the mileage by the neutral control being exhibited to the maximum.

In the disclosed structure, on the other hand, the hill hold brake can be regulated and control in its pressure without any addition of the solenoid valve so that the control system can be prevented from being large-sized and increased in cost.

BRIEF DESCRIPTION OF THE DRAWINGS

The invention will be described with reference to the drawings, in which:

FIG. 3 is an operation table of the aforementioned automatic transmission;

FIG. 6 is an engine torque map;

FIG. 7 is a torque ratio map;

FIG. 8 is a running resistance map;

FIG. 9 is a gear loss map;

FIG. 10 is a base offset map;

DESCRIPTION OF THE PREFERRED EMBODIMENTS

Figure 2:
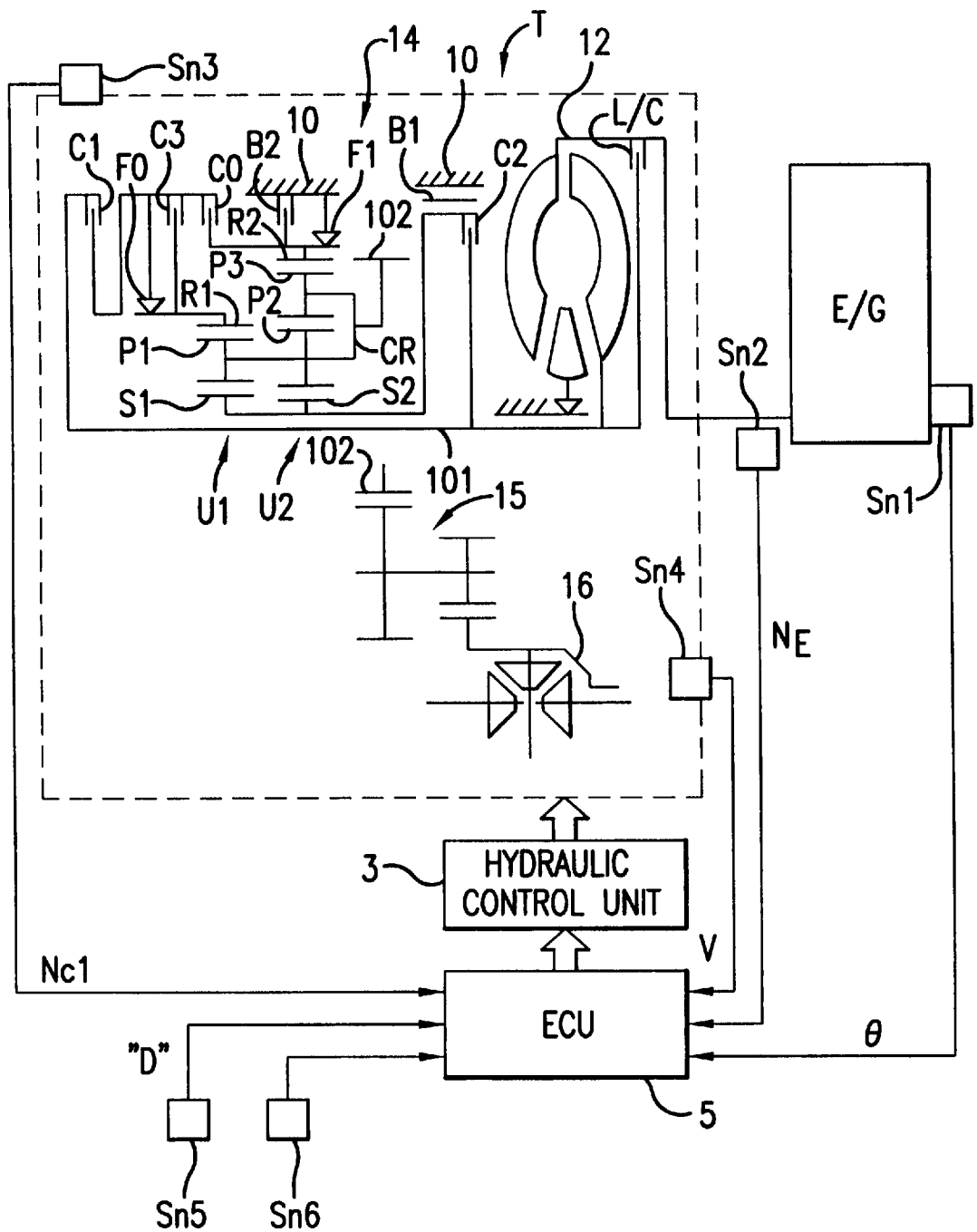
FIG. 2 is a block diagram showing the entire structure of an automatic transmission according to the first embodiment with only its mechanical portion in schematic form.

Here will be described the invention with reference to the drawings showing the embodiments of the invention. FIG. 2 shows a mechanical portion of a first embodiment of an automatic transmission according to the invention in schematic form and a control portion conceptionally in a block form. The automatic transmission includes a hydraulic power transmission 12 for transmitting the rotation of an engine E/G to a gear shifter 14; a first clutch C1 is applied, when a forward drive range is selected, for connecting the hydraulic power transmission 12 and the gear shifter 14; a one-way clutch F1 is locked, when the clutch C1 is applied, for establishing a first forward speed by the gear shifter 14; and a brake B1 for locking the one-way clutch F1, when applied, to block the backward rotation of an output shaft 102 of the gear shifter 14.

Figure 1:
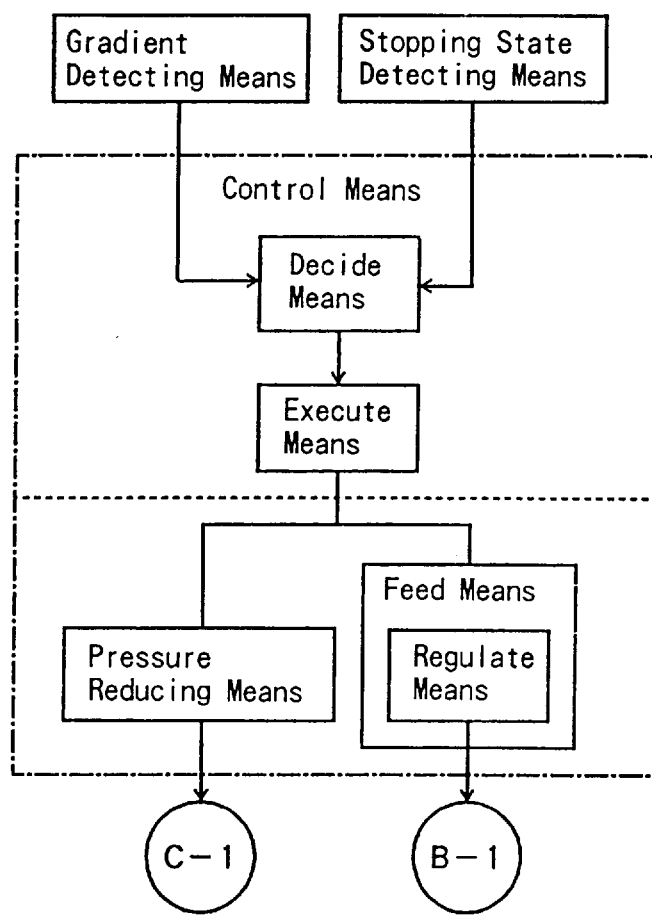
FIG. 1 is a block diagram conceptionally showing a first embodiment of the invention.

As shown in a block form in FIG. 1, the control system is structured to include a first hydraulic servo C-1 for applying the clutch C1 when fed with an oil pressure; a second hydraulic servo B-1 for applying the brake B1 when fed with the oil pressure; stopping state detecting means for detecting the stopping state of a vehicle based upon the vehicle speed (V), as detected by a vehicle speed sensor Sn4 (as shown in FIG. 2 like the other detect means), is substantially 0, the accelerator pedal, as detected by a throttle opening sensor Sn1, is released at $\theta=0$, and the foot brake pedal, as detected with ON of a brake switch Sn6, is depressed; gradient detecting means for detecting the gradient load of a slope, as acting upon the vehicle, by computations based upon the throttle opening ($\theta$) detected by the throttle opening sensor Sn1, the engine RPM ($N_E$) detected by an engine rotation sensor Sn2, the gear shifter input RPM ($N_{C1}$) detected by a clutch C1 sensor Sn3, and the vehicle speed (V) detected by the vehicle speed sensor Sn4; and control means for controlling the oil pressure to be fed to the first and second hydraulic servos C-1 and B-1 on the basis of the signals coming from the stopping state detecting means and the gradient detecting means.

The control means is structured to include decide means for deciding whether the road is uphill, on the basis of the signal from the gradient detecting means; pressure reducing means for reducing the oil pressure to be fed to the first hydraulic servo C-1 to release the clutch C1 substantially; feed means for feeding the oil pressure, as regulated on the basis of the signal from the gradient detecting means, to the second hydraulic servo B-1 to apply the brake B1 in a degree of engagement according to the gradient load; and execute means for causing the pressure reducing means to reduce the oil pressure to be fed to the first hydraulic servo C-1 and the feed means to feed the oil pressure to the second hydraulic servo B-1.

In this control system, the stopping state detecting means, the gradient detecting means, the decide means and the execute means comprise programs in an electronic control unit, and the pressure reducing means and the feed means are made of circuits in a hydraulic control unit.

The individual portions will be described in more detail. Turning to FIG. 2, an automatic transmission T in this embodiment is equipped with a four forward speeds and one reverse gear train for a front-engine, front-drive car. The automatic transmission T includes a torque converter 12 having a lockup clutch L/C and acting as the hydraulic power transmission; a gear train having a planetary gear unit 14 and acting as the gear shifter; a counter gear 15 acting as the speed reducer; a differential unit 16; a hydraulic control unit acting as control means for controlling the aforementioned gear train and lockup clutch L/C; and an electronic control unit (ECU) 5 acting as control means for controlling the hydraulic control unit 3.

The reference characters Sn1, appearing in the drawing, designate a throttle sensor for detecting the throttle opening ($\theta$) of the engine E/G. The throttle sensor Sn1 constitutes the acceleration detecting means for detecting the action of the accelerator pedal in the present embodiment. Sn2 designates an engine rotation sensor for detecting the RPM ($N_E$) of the engine E/G; Sn3 designates a clutch C1 rotation sensor for detecting the RPM ($N_{C1}$) of the clutch C1 of the automatic transmission T; Sn4 designates a vehicle speed sensor acting as vehicle speed detecting means for detecting the vehicle speed (V) from the output RPM; Sn5 designates a neutral start switch for detecting the shift position; and Sn6 designates a brake switch acting as brake detecting means for detecting the action of the brake pedal. The electronic control unit 5 is made up of a control computer which issues ON and OFF signals and a duty control signal to the individual valves of the hydraulic control unit 3 on the basis of the data from the aforementioned individual sensors, but primarily based on the vehicle speed (V) and the throttle opening ($\theta$), and in accordance with stored programs.

The gear train 14 of the automatic transmission T includes a planetary gear unit U1 of the single pinion construction composed of a sun gear S1, a ring gear R1 and a pinion gear P1 meshing with them; a planetary gear unit U2 of the double pinion construction composed of pinion gears P2 and P3 meshing with each other and making a pair, a sun gear S2 meshing with the pinion gear P2, and a ring gear R2 meshing with the pinion gear P3; four multiple disc clutches C0 to C3 including the first clutch C1; a band brake B1 for locking the one-way clutch F1 and blocking the backward rotation of the output gear 102 forming the output shaft of the gear shifter and a multi-plate brake B2 for the engine brake, and a one-way clutch F1 and a one-way clutch F0 to be locked, when the first clutch C1 is applied, to establish the first forward speed of the gear shifter.

In the gear units U1 and U2, the sun gear S1 and the sun gear S2 are connected to each other, and the individual pinion gears P1, P2 and P3 are so connected that they are supported by a common carrier CR. Moreover, the ring gear R1 of the gear unit U1 can be connected through the first clutch C1 and the clutch C3 in series with the first clutch C1 to an input shaft 101 which is connected to the turbine output shaft of the torque converter 12. The ring gear R2 of the gear unit U2 can be connected through the clutch CO and the first clutch C1 in series with the clutch CO to the input shaft 101 and can be fixed on a transmission case 10 by the brake B2. On the other hand, the two sun gears S1 and S2, as directly connected to each other, can be connected through the reverse clutch C2 to the input shaft 101 and can be fixed on the case 10 by the brake B1. In parallel with the clutch C3 and the brake B2, moreover, there are arranged the one-way clutch F0 and the one-way clutch F1. Moreover, the carrier CR, as shared among the individual pinion gears P1, P2 and P3, is connected in this mode to the output shaft or the output gear 102. Incidentally, the output gear 102 is connected to the differential unit 16 through the counter gear 15, as arranged in parallel with the input shaft 101 to act as a speed reducing gear arranged in parallel, and the differential unit 16 is connected to the right and left wheels of the vehicle.

In the gear shifter 14 having the aforementioned structure, the first speed is established from the most decelerated output of the carrier CR by the input of the ring gear R1 with the first clutch C1 and the clutch C3 being applied and by the reaction support of the fixed ring gear R2 with the one-way clutch F1 being applied. On the other hand, the second speed is established in the same input state by the reaction support of the fixed sun gear S1 with the brake B1 being applied and by the rotation of the carrier CR, as caused by the revolution of the pinion gear P1. Moreover, the third speed is established in the integral rotating states of the two gear units U1 and U2 with all the first clutch C1, the clutch C3 and the clutch CO being applied and by the simultaneous inputs from the two ring gears R1 and R2. Moreover, the fourth speed is established by the input of the ring gear R2 with the clutch C1 and the clutch CO being applied and by the accelerated rotation of the carrier CR by the reaction support of the sun gear S2 with the brake B1 being applied.

Especially in this gear train, moreover, not the ordinary first speed state but the second speed state with the brake B1 being applied is established at the time of a hill hold. At this time, the backward force of the vehicle acts to rotate the output gear 102 backward, but the brake B1 is applied in the driving connected state of the second speed to fix the sun gear S2 so that the one-way clutch F1 comes into the locked state in the backward rotation to fix the ring gear R2, as well. As a result, the relative backward rotations of the pinion gears P1 and P2, meshing with each other, are blocked to block the backward rotation of the output gear 102 so that the hill hold state is established.

FIG. 3 shows, in table form, the actions of the aforementioned individual clutches, brakes and one-way clutches in the individual range positions and the relationships among the individual gear stages, i.e., the first (1ST) to fourth (4TH) speeds to be established by the actions. In FIG. 3, the letter "R" indicates reverse; the letter "N" indicates neutral; the letter "D" indicates each drive (forward) range position; the letter "N" indicates the neutral control state; and letters O.W.C. indicate a one-way clutch. The meaning of the symbols used in the individual columns are defined in the Remarks.

The hydraulic circuit acting as the control means for controlling the gear trains thus structured uses an oil pump, as built into the transmission mechanism, as the oil pressure source is found in the hydraulic circuit of the hydraulic control unit of the prior art, and is equipped with a variety of regulator valves, a manual valve, a linear solenoid valve, an ON/OFF solenoid valve, a variety of shift valves, check valves and orifices, as inserted in the oil passage for connecting the valves, such as a primary regulator valve for regulating the discharge pressure to the highest pressure, i.e., the line pressure, as required by the circuit, in accordance with the vehicle speed (V) and the throttle opening (θ) at each instant and for outputting an excess pressure as a secondary pressure, and a secondary regulator valve for regulating and lowering a secondary pressure to a torque converter feed pressure and for outputting the residual pressure as a lubrication pressure.

Figure 4:
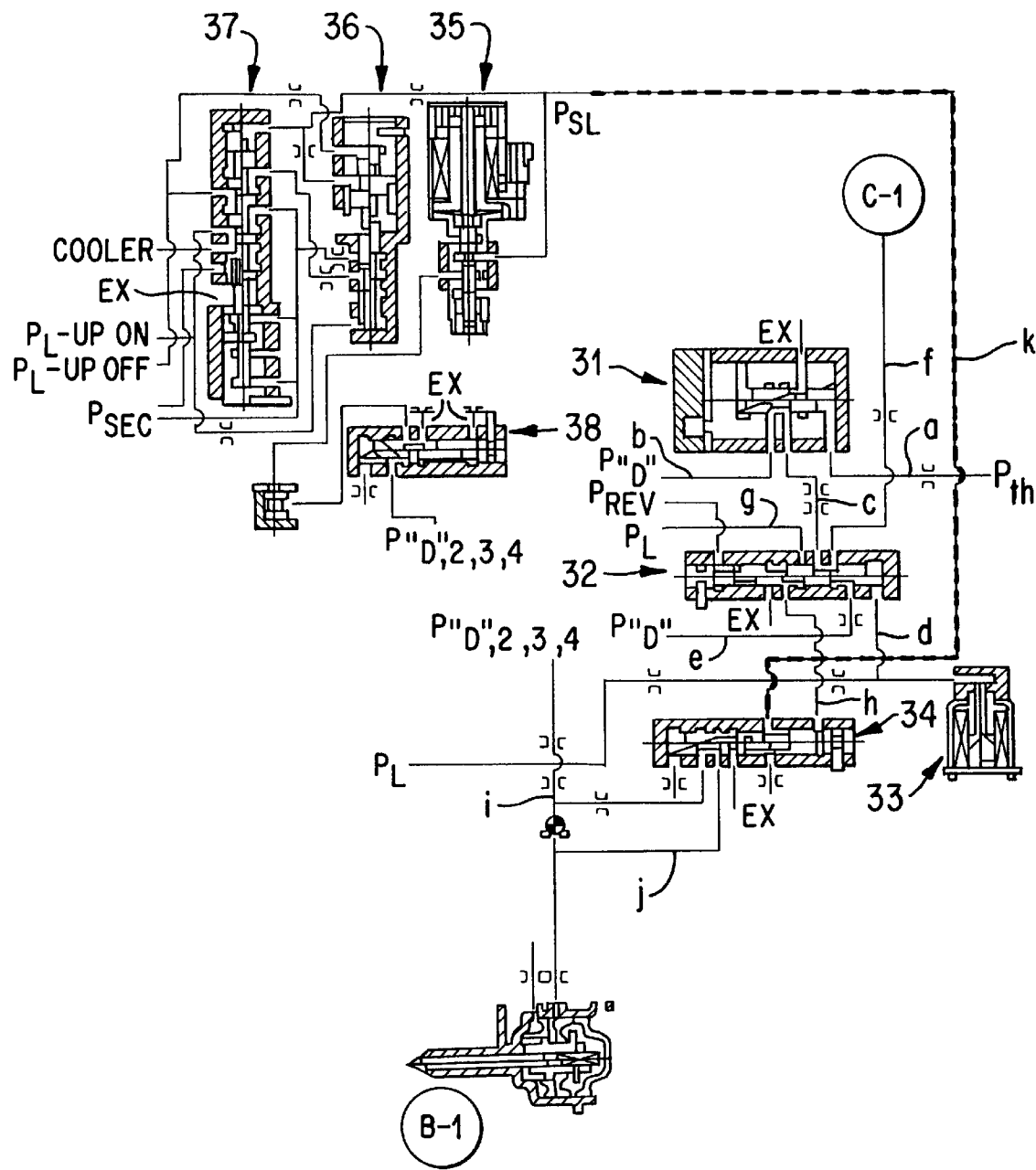
FIG. 4 is a partial circuit diagram of a hydraulic control unit of the aforementioned automatic transmission.

FIG. 4 shows only the portion of the aforementioned hydraulic circuit pertinent to the invention. The circuit is structured, in association with the hydraulic servo C-1 of the clutch C1 and the hydraulic servo B-1 of the brake B1, to include a C-1 control valve 31 constituting the pressure reducing means; a neutral relay valve 32; an ON/OFF solenoid valve 33 for controlling the relay valve 32; a B-1 modulator valve 34 constituting the feed means; and a linear solenoid valve 35 for controlling the modulator valve 34. In this mode, the linear solenoid valve 35 is exemplified by a lockup linear solenoid valve for applying a signal pressure to a lockup control valve 36 for the lockup circuit and a lockup relay valve 37.

The C-1 control valve 31 is made of a spool valve having lands of equal diameters at its two ends and is fed at its one spool end with a throttle signal pressure($P_{th}$) of an oil passage a leading from the throttle control valve (not shown) and at its other end with a feedback pressure in the opposite direction through an orifice in the spool so that it is constructed as a secondary pressure actuated pressure reducing valve for adjusting the degrees of opening of the output port, the input port and the drain port. Of these, the input port is connected to a D-range pressure oil passage b leading from the manual valve (not shown), and the output port is connected to an oil passage c for connection to the neutral relay valve 32.

The neutral relay valve 32 is made of a spring return type spool valve having three lands of equal diameters and is suitably fed at its one spool end with an oil pressure ($P_L$) of a line pressure oil passage d and at its return spring side end with an R-range pressure ($P_{REV}$) through the manual valve (not shown) so that it is structured as a change-over valve. Moreover, the neutral relay valve 32 is equipped with an input port connected to a D-range pressure oil passage e coming from the manual valve (not shown); a feed/discharge port connected to a servo oil passage f connected to the hydraulic servo C-1, a communication port connected to the oil passage c for connection to the aforementioned C-1 control valve 31, an input port connected to a line pressure oil passage g, a signal pressure output port connected to an oil passage h for connection to the B-1 modulator valve 34, and a port for connection to a drain (EX).

The solenoid valve 33 is made of a normal open type ON/OFF valve which is closed when it is fed with a solenoid ON signal from the electronic control unit 5. The solenoid valve 33 is connected with the line pressure oil passage d to drain the line pressure ($P_L$) of the oil passage d and to apply the solenoid signal pressure to the neutral relay valve 32 at the stop of the drainage.

Thus, on the basis of the signals from the electronic control unit 5, the C-1 control valve 31, the neutral relay valve 32 and the solenoid valve 33 perform the change-over functions, in which they are selectively switched between a feed position (as indicated at the lower half of the valves 31, 32 and the left half of the valve 33 in the drawing), in which the D-range pressure ($P_D$) of the oil passage e is fed to the hydraulic servo C-1 of the clutch C1, and a discharge position (as indicated at the upper half of the valves 31, 32 and the right half of the valve 33 in the drawing), in which the feed oil pressure is lowered to the regulated oil pressure, and constitute the pressure reducing means of the invention.

Next, the B-1 modulator valve 34 is made of a spool type pressure regulator valve acting under the loads of a plunger and a spring and is equipped with an input port connected to a 1–2 shift valve (not shown) via an oil passage i, a pressure regulating port connected to the hydraulic servo B-1 via a servo oil passage j and a drain (EX) connection port of the oil passage j. This valve is selectively fed at its plunger end with the line pressure ($P_L$) from the oil passage h, at its spring end side with a linear solenoid pressure ($P_{SL}$) from an oil passage k, as will be detailed, and at its spool end with the feedback pressure through an in-spool orifice from the opposed pressure regulating port side, so that it acts to regulate the pressure.

On the basis of the signal from the electronic control unit 5, the linear solenoid valve 35 reduces the oil pressure, which is reduced through a lockup modulator valve 38 from a D-range pressure ($P_D$) fed at the 2nd to 4th speeds through the 1–2 shift valve (not shown), and outputs the linear solenoid signal pressure ($P_{SL}$). The linear solenoid signal pressure ($P_{SL}$) is applied via the signal pressure oil passage k to the spring loaded end side of the aforementioned B-1 modulator valve 34.

Thus, the B-1 modulator valve 34 and the linear solenoid valve 35 allow the linear solenoid valve 35 to act as control means in accordance with the signal from the electronic control unit 5 and perform the functions as the feed means, as so called in the invention, to regulate the pressure by sliding between the feed position (as indicated at the lower half of the drawing in FIG. 4), in which it feeds the D-range pressure ($P_D$) to the hydraulic servo B-1 of the brake B1 via the oil passage j bypassing the check ball of the oil passage i, and the discharge position (as indicated at the upper half of the drawing in FIG. 4), in which it connects the oil passage j to the drain (EX).

Figure 5:
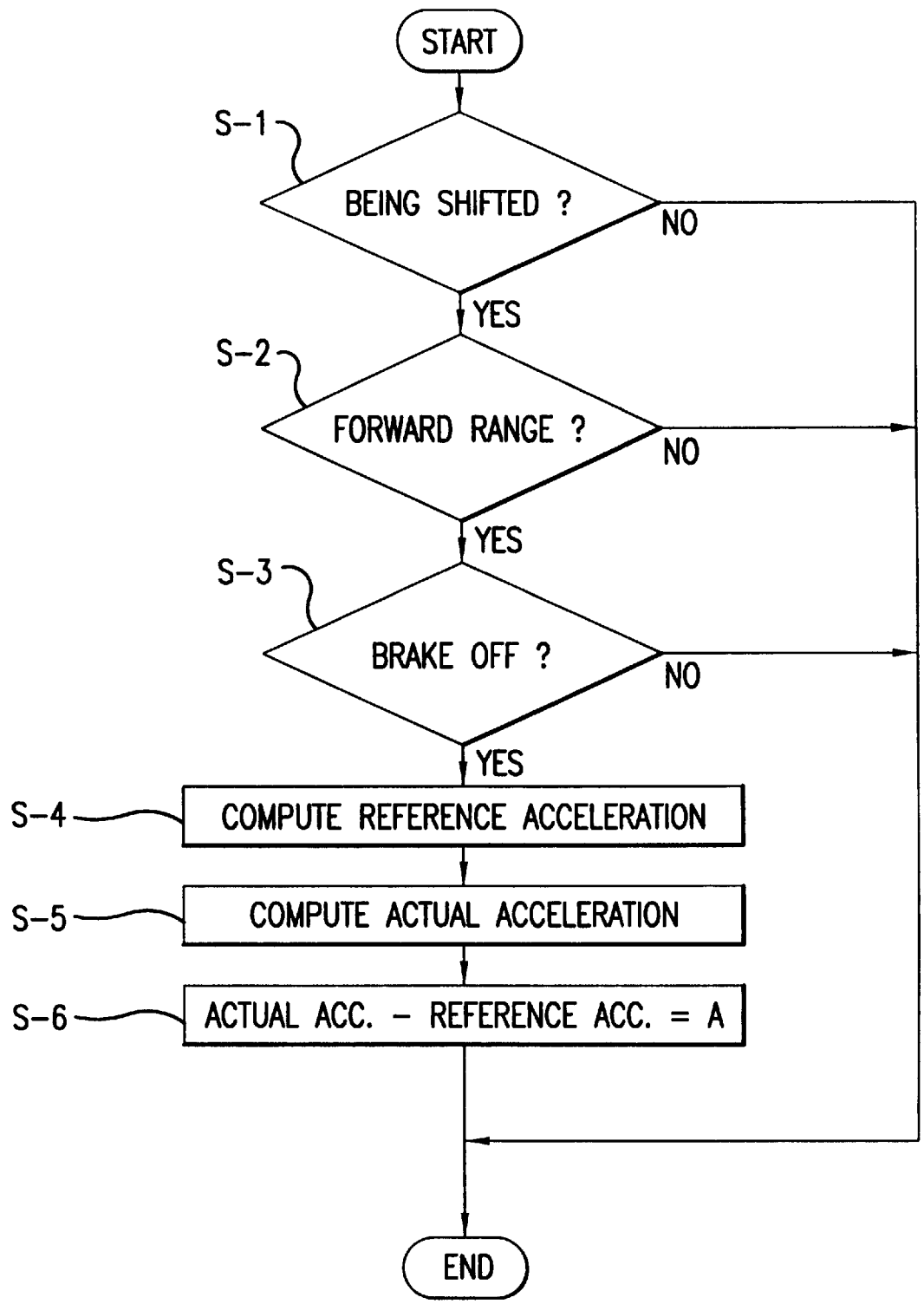
FIG. 5 is a flowchart showing gradient detection of the control system in the first embodiment.

The control of the hydraulic circuit thus structured is effected by the electronic control unit 5 acting as the control means. FIG. 5 is a flowchart of a gradient detecting routine in the electronic control unit which constitutes the gradient detecting means. In this processing, under the conditions of not being shifted at Step S-1, in a forward range at Step S-2 and the brake OFF at Step S-3, the computations are made for a reference acceleration in Step S-4, an actual acceleration in Step S-5 and a gradient load (A) in Step S-6.

Here will be described the computations of the gradient load (A). First of all, the reference acceleration ($\alpha_S$) is as follows. Specifically, the engine torque is determined from a map (FIG. 6) by a linear interpolation on the basis of the throttle opening ($\theta$) and the engine RPM ($N_E$). Next, the speed ratio (i.e., the input RPM of the gear shifter/the RPM of the engine) is computed from the input/output RPM of the gear shifter to determine the torque ratio, as corresponding to the speed ratio, from the map (FIG. 7). Next, the engine torque is multiplied by the torque ratio to determine the input torque of the gear shifter. By using the gear shifter input torque thus determined, an initial reference acceleration ($\alpha_S 1$) is computed. Specifically:

$\alpha_s 1$ = (Gear Shifter Input Torque × Gear Ratio ×

Differential Ratio/Tire Diameter −

Running Resistance on Flat Road −

Gear Loss)/Vehicle Weight.

Here, the running resistance on the flat road is determined from the map (FIG. 8) in a manner to correspond to the vehicle speed (V), and the gear loss is determined from the map (FIG. 9) in a manner to correspond to the gear stage. Next, an intermediate reference acceleration ($\alpha_S 2$) is determined from the following blunting, or averaging, formula by storing the four preceding initial reference accelerations ($\alpha_S 1$) and by using the four previous values and the present value:

$$\alpha_S 2 = (\alpha_S 1_{k-4} + \alpha_S 1_{k-3} + \alpha_S 1_{k-2} + \alpha_S 1_{k-1} + \alpha_S 1_k)/5.$$

Here, the letters "k-n" in the formula indicate the value preceding the current value k by n.

Thus, the final reference acceleration ($\alpha_S$), i.e., "the reference acceleration", is determined by the following blunting computations from the intermediate reference acceleration ($\alpha_S 2$) just determined and the reference acceleration preceding by one ($\alpha_{Sk-1}$). Here, the value (i.e., a base offset) to be used for the aforementioned correction is determined by a linear interpolation from the map (FIG. 10) of the gear stage and the throttle opening. Specifically:

$$\alpha_S = \{\alpha_{Sk-1} \times 3 + (\alpha_S 2 - Base\ Offset)\}/4.$$

Incidentally, the aforementioned correction is necessary for correcting the dispersions of the aforementioned running resistance, because the gear loss and the output torque differ for each engine.

The actual acceleration ($\alpha_A$) is calculated as follows. First of all, an initial actual acceleration ($\alpha_A 1$) is determined from the following weighing average by storing the four preceding vehicle speeds (V) and by using the stored four previous speeds and present vehicle speed ($V_k$) (for a sampling time of 0.1 (s)):

$$\alpha_A 1 = \{(V_k - V_{k-4}) \times 2 + (V_{k-1} - V_{k-3})\}/10.$$

Next, an intermediate actual acceleration ($\alpha_A 2$) is determined using a blunting computation, by storing the initial actual accelerations ($\alpha_A 1$) calculated at two preceding accelerations and by using the two stored values and the present intermediate actual acceleration ($\alpha_A 1k$). Specifically:

$$\alpha_A 2 = (\alpha_A 1_{k-2} + \alpha_A 1_{k-1} + \alpha_A 1_k)/3.$$

Here, the letters "k-n" indicate the value preceding the current value k by n. Thus, the final actual acceleration ($\alpha_A$), the actual acceleration, immediately preceding, is determined by the following blunting computation using the actual acceleration ($\alpha_{Ak-1}$) and the current intermediate actual acceleration ($\alpha_A 2$). Specifically:

$$\alpha_{Ak} = (\alpha_{Ak-1} \times 3 + \alpha_A 2)/4.$$

Here, the letters "k-n" in this formula indicate the value preceding the current value k by n.

The value A, as computed by subtracting the reference acceleration ($\alpha_S$) from the actual acceleration ($\alpha_A$) thus obtained, is used for the hill hold control not as the mere slope gradient but as the slope gradient load conforming to the actual situations considering the load state or the line of the vehicle. According to an advantage of this embodiment, the backward force of the vehicle, as would be generated by the gradient of the slope during the run of the vehicle, can be computed to clarify the desired hold force in advance when the vehicle is stopped so that the stopping state is detected. As a result, the neutral control and the hill hold control can be executed before the vehicle starts rolling backwards, as would be caused by the slip of the brake B1.

Figure 13:
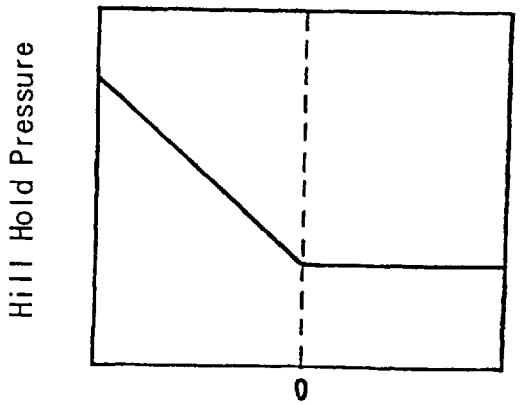
FIG. 13 is a graph illustrating one example of setting the detected value and the hill hold pressure by a gradient detecting means of the control system of the first embodiment.
Figure 14:
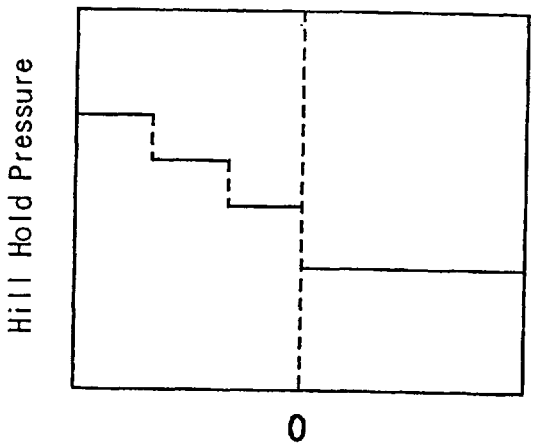
FIG. 14 is a graph illustrating another example for setting the aforementioned detected value and the hill hold pressure.

The hill hold pressure for the value A, as determined as the difference between the actual acceleration and the reference acceleration, can be set to increase linearly at a predetermined rate as the value A increases in the negative direction, as illustrated in FIG. 13, or to increase stepwise, as illustrated in FIG. 14.

Figure 11:
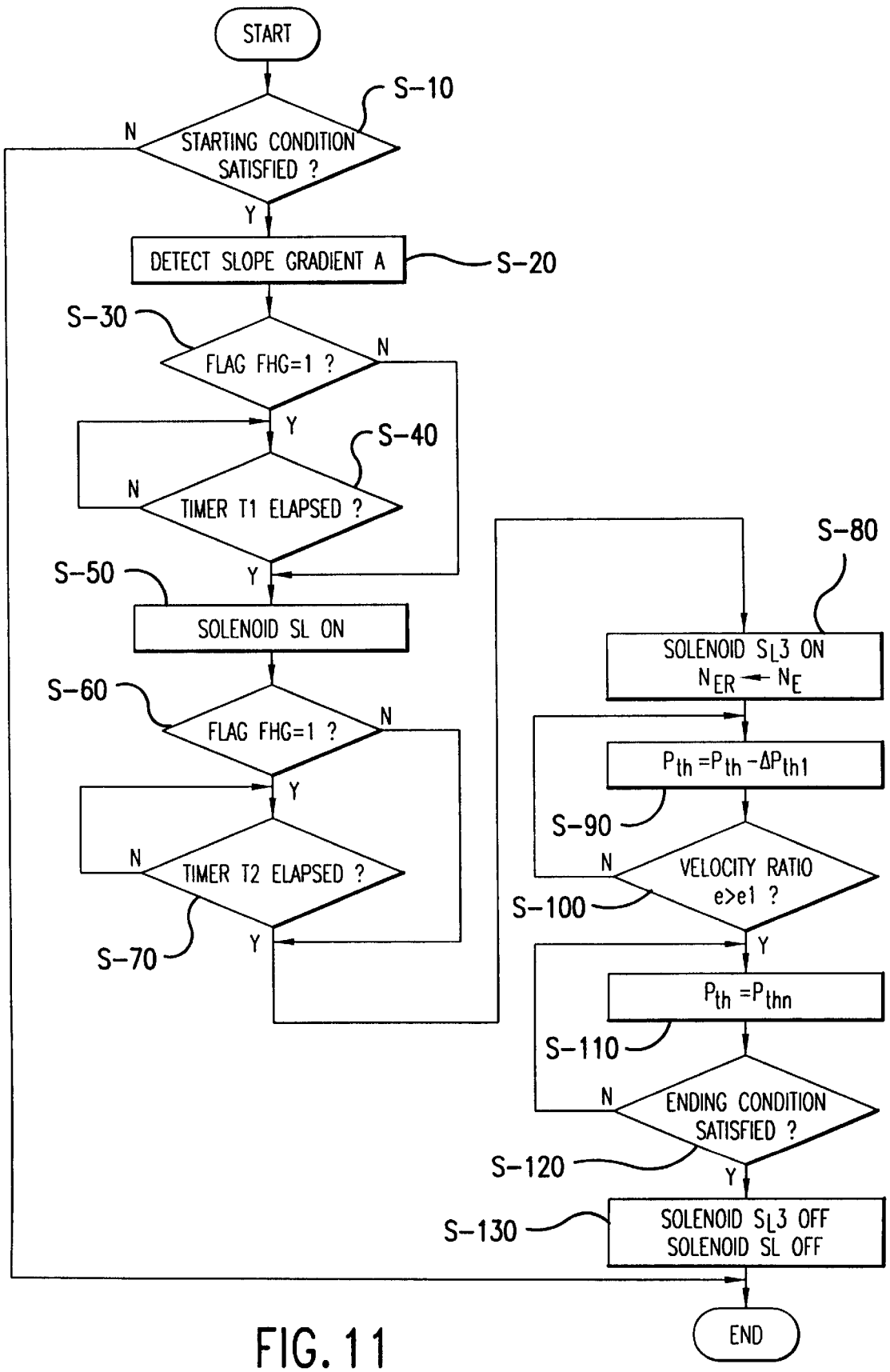
FIG. 11 is a flowchart showing neutral and hill hold controls of the control system of the first embodiment.

The hill hold control using the gradient load thus obtained is carried out in the following manner. As shown in the main flow of the flowchart of FIG. 11, it is decided at Step S-10 whether the neutral control starting condition is satisfied. The answer is YES if the D-range is selected as determined from the signal of the neutral start switch Sn5, the vehicle speed (V) is 0, the throttle opening (θ) is 0, and the brake switch Sn6 is ON are all satisfied. At Step S-20, the slope gradient load (A) when the vehicle is stopped is computed. At Step S-30, a flag (FHG) for slope decision is set. If the slope decision is made, the starting condition frequently holds. At Step S-40, a timer runs for a predetermined period before further action to prevent hunting.

In order to start the hill hold control by the B1 modulator pressure according to the slope gradient load (A) of Step S-30, moreover, the solenoid SL ON signal is output at Step S-50 for outputting the signal pressure $P_{SL}$ from the linear solenoid valve 35. This is defined as the execute means. In the hydraulic circuit, shown in FIG. 4, therefore, the oil pressure of the solenoid signal pressure oil passage k is applied to the spring loaded side end portion of the spool of the B-1 modulator valve 34, so that the input port at the side of the oil passage i is opened by the leftward displacement of the spool thereby to start the pressure regulating operation in which the oil pressure $P_D$ is output to the output port at the side of the oil passage j. As a result, the bypass by the B-1 modulator valve 34 to the hydraulic servo B-1, which is normally blocked by the check ball (unnumbered), is established to start the piston stroke of the hydraulic servo B-1. Then, in the flow shown in FIG. 11, the flag (FHG) for the slope decision is checked at Step S-60, which constitutes the decision means of the invention. If the slope is determined, a second timer is measured at Step S-70 so as to delay the start of the neutral control until the brake B1 reaches engagement for the hill hold. When the timer value reaches T2, the flow enters the neutral control according to the input torque (as computed from the map data for the engine RPM) so that the clutch C1 may be substantially released. If the decision concerning the flag (FHG), at Step S-60, indicates non-slope, the routine skips to Step S-80 without any timer measurement.

At Step S-80, a solenoid signal SL3 for closing the solenoid valve 33 is output to set the present engine RPM ($N_E$) as the engine RPM ($N_{ER}$) at the control starting time so that the throttle control valve (not shown) outputs the throttle signal pressure ($P_{th}$) corresponding to the engine RPM ($N_{ER}$). Step S-80 corresponds to the execute means, as called in the invention. At Step S-90, the throttle signal pressure ($P_{th}$) for lowering the oil pressure ($P_{C-1}$) of the hydraulic servo C-1 at a predetermined rate is reduced by a predetermined amount ($\Delta P_{th1}$). At this time, the predetermined amount ($\Delta P_{th1}$) is set to lower the oil pressure at a predetermined rate. On the hydraulic circuit, the neutral relay valve 32 is then switched to a position for providing the communication between the oil passage c and the oil passage f so that the pressure reduction is performed in the operation in which the pressure is regulated by the C-1 control valve 31.

At Step S-100, the applied state of the clutch C1 is detected in terms of whether the input/output rotation ratio e of the torque converter exceeds a predetermined value $e_1$. The decision is made on the basis of the signals which are detected by the engine rotation sensor Sn2 and the clutch C1 rotation sensor Sn3. If the answer is YES, the throttle signal pressure ($P_{th}$) is set at Step S-110 to a value ($P_{thm}$) for the clutch C1 to be substantially released. This state is continued until any of the control ending conditions of Step S-120 are met, that is, the vehicle speed is not 0, the throttle opening is not 0 and/or the brake switch is OFF. If the control ending condition is satisfied, a duty solenoid signal (SL) and the solenoid signal ($S_L3$) are turned OFF at Step S-130. At this time, the neutral relay valve 32 is switched to the feed position at which the neutral relay valve 32 feeds the D-range pressure ($P_D$) to first clutch C1, as shown at the lower half of the drawing in FIG. 4, and the B-1 modulator valve 34 is switched to the position shown at the lower half of the drawing in FIG. 4, and hydraulic servo B-1 is connected through passages j and i to a shift value (not shown) exhaust, so that the neutral control and the hill hold control are ended. Thus, the clutch C1 is returned to the applied state, and the brake B1 is returned to the released state, so that the automatic transmission returns to the ordinary D-range first speed state.

The relationship between the hill hold control and the lockup control by the common linear solenoid valve 35 will now be described. At the hill hold control time, the B-1 modulator valve 34 is fed with the linear solenoid signal pressure ($P_{SL}$), as output by the linear solenoid valve 35, so that it comes into the pressure regulating state, but the lockup control valve 36 and the lockup relay valve 37 are so structured by setting their springs and pressure receiving areas, that they are not operated by the linear solenoid signal pressure ($P_{SL}$). During the lockup control, on the other hand, the lockup control valve 36 and the lockup relay valve 37 are fed with the linear solenoid signal pressure ($P_{SL}$) to turn ON and OFF the lockup clutch and to perform the slip control. At this time, however, the B-1 modulator valve 34 is fed at its plunger end with the line pressure ($P_L$) via the oil passage g and the oil passage h by the change-over of the neutral relay valve 32 so that it is fixed in the fully open position (as indicated by the lower half of the drawing) thereby to make it possible that the pressure of the hydraulic servo B-1 is not moderated by the linear solenoid valve 35.

Figure 12:
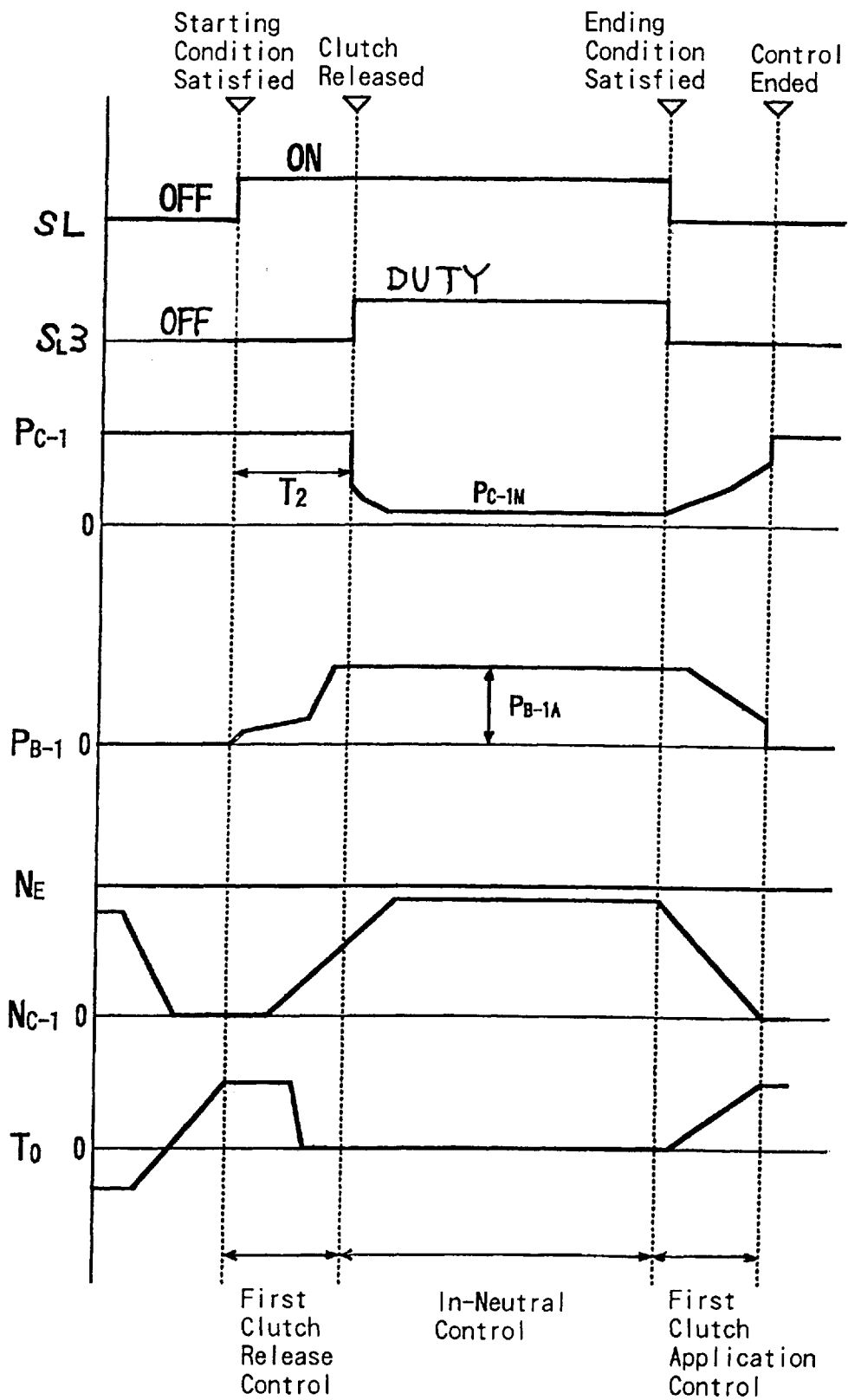
FIG. 12 is a time chart illustrating the control characteristics which are obtained by the control system of the automatic transmission of the first embodiment.

A time chart according to the aforementioned flow is illustrated in FIG. 12. At the state before the control start, the gear shifter 14 is shifted to the first speed gear stage so that the clutch C1 rotation ($N_{C-1}$) is 0 in the applied state by the feed of the clutch application pressure ($P_{C-1}$) to switch output torque ($T_0$) from a negative value for the wheel drive to a positive value in the creep state. If the starting conditions are satisfied, a brake servo pressure ($P_{B-1}$) is raised by the output of the signal of the solenoid SL to start the brake B1 application. As a result, the brake servo pressure ($P_{B-1}$) rises gradually till the hydraulic servo ends the piston stroke, but abruptly, when the torque absorption by the engagement of the friction members, to reach a specified brake servo pressure ($P_{B-1A}$) according to the gradient load (A). As a result, the gear shifter 14 transfers to the second speed state to establish the hill hold state. During this time, the clutch C1 starts to slip as the brake B1 absorbs the torque, to start the clutch rotation ($N_{C-1}$), whereas the output shaft torque ($T_0$) drops to 0.

Awaiting the lapse of the time period of the timer $T_2$ according to the gradient load, therefore, the solenoid $S_L3$ is turned ON to release the clutch applying pressure ($P_{C-1}$) thereby to cause the neutral control in which the clutch C1 is substantially released. As a result, the clutch applying pressure ($P_{C-1}$) quickly drops until it is held at a predetermined pressure ($P_{C-1M}$). Throughout these periods, the engine rotation ($N_E$) is kept at a constant idle RPM by the throttle OFF.

If an ending condition is satisfied, the two solenoid signals SL and $S_L3$ are then simultaneously turned OFF. By the resultant recovery of the clutch applying pressure ($P_{C-1}$), the re-application of the clutch C1 is started and, by the release of the brake application pressure ($P_{B-1}$), the release of the brake B1 is started. As a result, the clutch rotation ($N_{C-1}$) returns to 0, and the output shaft torque ($T_0$) returns to the positive value in the creep state. Thus, the gear shifter 14 returns to the first speed gear stage state.

As has been described in detail, according to the structure, the feed of the oil pressure to the hydraulic servo B-1 for-applying the hill hold brake B1 is controlled according to the gradient load of the hill, as detected by the gradient detecting means, so that the hill hold brake B1 is applied at an engaging extent according to the gradient load A to effect the hill hold with neither jitter nor an engaging shock. As a result, the neutral control of the uphill can be executed without difficulty irrespective of the gradient of the slope thereby improving the mileage of the neutral control. In the uphill case, on the other hand, the hill hold control precedes. If the gradient is so low that the vehicle will not roll back, the two controls are executed simultaneously. Thus, the timing of no neutral control can be minimized to maximize the effect of improving the mileage by the neutral control. Moreover, the pressure of the hill hold brake can be regulated and controlled without adding any solenoids thereby preventing the control system from becoming large-sized and increasing its cost.

Figure 15:
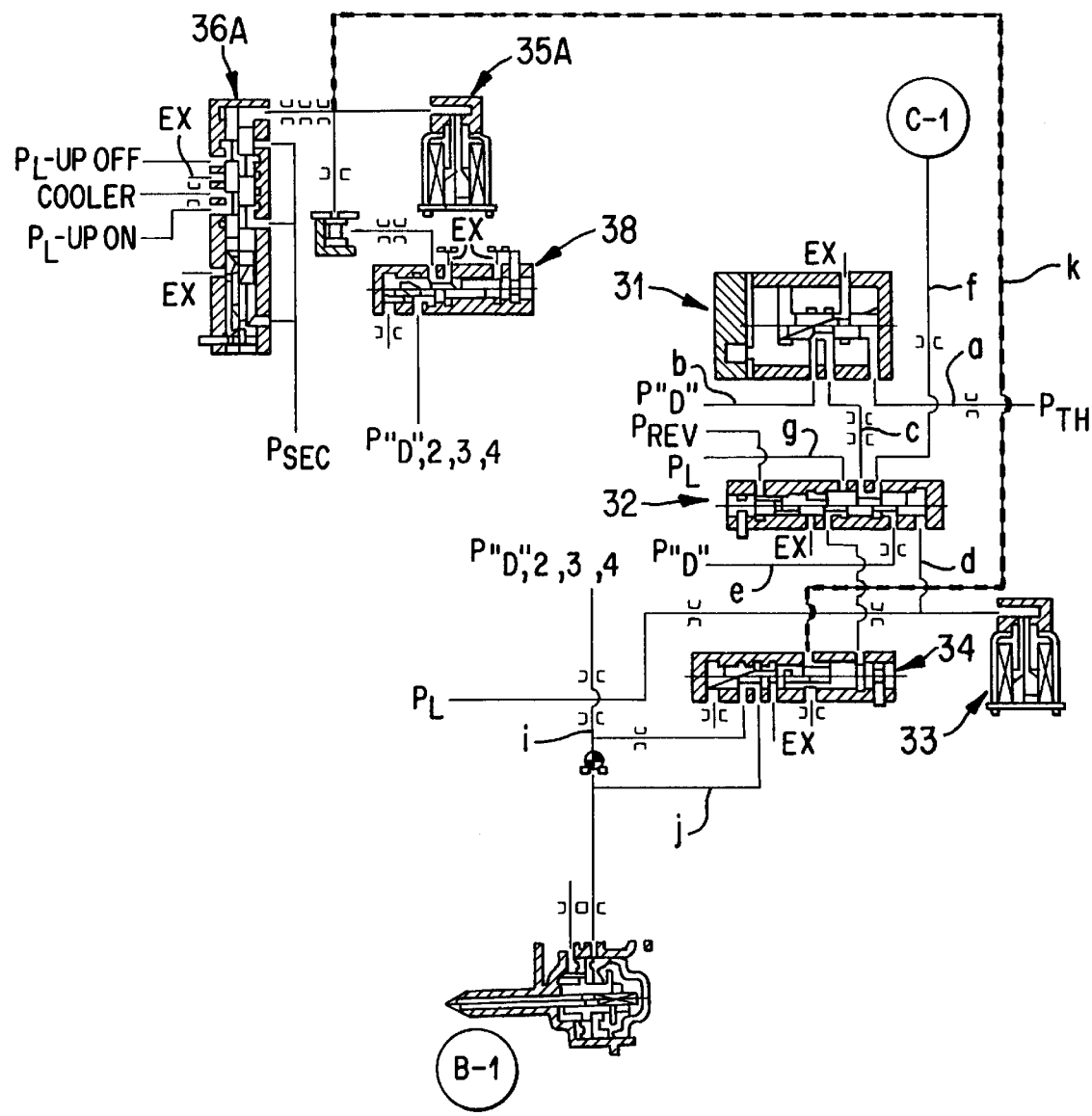
FIG. 15 is a partial circuit diagram of a hydraulic control unit according to a second embodiment of the invention.

Next, FIG. 15 shows a second embodiment in which the structure of the lockup circuit in the first embodiment is changed. In the second embodiment, there is adopted a system in which the lockup circuit is structured to be controlled only by a lockup control valve 36A and in which an ordinary solenoid valve 35A is duty-controlled in place of the lockup linear solenoid valve 35. The remaining structure similar to that of the first embodiment, and the description thereof will be omitted by using the same reference numerals. Even by adopting this structure, the solenoid valve 35A can be likewise used for the control of the lockup signal pressure and the control pressure of the brake BI to make the control similar to that of the aforementioned first embodiment.

Although the invention has been described in detail in connection with two embodiments, it can be practiced by changing the detailed specific structure in various ways within the scope of claims. Especially the individual signal detecting means should not be limited to those of the embodiments but could be exemplified either by means for directly detecting the operation of the accelerator pedal, the vehicle speed and the operation of the foot brake pedal, or by means for detecting the signals, as could be obtained indirectly from their operations or changes, if it could detect the substantially necessary signals. On the other hand, the slope gradient detecting means may perform its detection on the basis of a gradient angle sensor that detects the gradient directly.

What is claimed is:

1. A control system for an automatic transmission, comprising:
    a hydraulic power transmission for transmitting the rotation of an engine to a gear shifter;
    a clutch to be applied, when a forward drive range is selected, for connecting the hydraulic power transmission and the gear shifter to each other;
    a one-way clutch to be locked, when the clutch is applied, for establishing a first forward speed of the gear shifter;
    a brake for locking the one-way clutch, when applied, to block backward rotation of an output shaft of the gear shifter;
    a first hydraulic servo for applying the clutch when fed with an oil pressure;
    a second hydraulic servo for applying the brake when fed with an oil pressure;
    stopping state detecting means for detecting the stopping state of a vehicle based on the vehicle speed being substantially 0, the accelerator pedal in a released state and the foot brake pedal depressed;
    gradient detecting means for detecting the gradient load of an uphill, as applied to the vehicle; and
    control means for controlling the oil pressure to be fed to the first and second hydraulic servos on the basis of signals from the stopping state detecting means and the gradient detecting means, wherein the control means includes:
        decide means for deciding whether the road is uphill, on the basis of the signal from the gradient detecting means;
        pressure reducing means for reducing the oil pressure to be fed to the first hydraulic servo, to bring the clutch into a substantially released state;
        feed means for feeding an oil pressure, as regulated on the basis of the gradient detecting means, to the second hydraulic servo, to apply the brake at an engaging extent according to the gradient load; and
        execute means for executing the reduction of the feed oil pressure to the first hydraulic servo by the pressure reducing means and the feed of the regulated oil pressure to the second hydraulic servo by the feed means, if it is detected by the stopping state detecting means that the vehicle is in the stopping state and if it is decided by the decide means that the road is uphill.

2. The control system for an automatic transmission according to claim 1, wherein the feed means has pressure regulating means for raising the feed oil pressure to a higher level for a higher gradient load, as detected by the gradient detecting means.

3. The control system for an automatic transmission according to claim 1, wherein the gradient detecting means detects the gradient load by comparing an actual acceleration while the vehicle is running and a reference acceleration, as computed on the basis of the input torque to the gear shifter.

4. The control system for an automatic transmission according to claim 3, wherein the gradient detecting means detects the gradient load if the gear shifter is in the forward range, is not being shifted and if the foot brake pedal is not depressed.

5. The control system for an automatic transmission according to claim 3, wherein the reference acceleration is computed on the basis of the ideal acceleration of the vehicle, as achieved on a flat road from the input torque to the gear shifter, the gear stage of the gear shifter, and the vehicle speed.

6. A control system for an automatic transmission according to claim 5, wherein the execute means starts the feed of the oil pressure to the second hydraulic servo by the feed means, and, after a predetermined period of control passes, the reduction of the feed oil pressure to the first hydraulic servo by the pressure reducing means, if it is decided by said stopping state detecting means that the vehicle is in the stopped state and if it is decided by said decide means that the road is uphill.

7. The control system for an automatic transmission according to claim 6, wherein the predetermined period of control continues until at least the application of the brake ends.

8. The control system for an automatic transmission according to claim 1, wherein the feed means has pressure regulating means for regulating the feed oil pressure to the second hydraulic servo by a lockup controlling solenoid valve of the gear shifter.

9. A control system for an automatic transmission, used with an engine driven vehicle, comprising:
   a gear shifter having an output shaft;
   a transmission for transmitting a rotation of the engine to the gear shifter;
   a clutch, when a forward drive range is selected, connecting the power transmission and the gear shifter;
   a one-way clutch to be locked for establishing a first forward speed of the gear shifter when the clutch connects the power transmission and the gear shifter;
   a brake which locks the one-way clutch to restrict backward rotation of the output shaft of the gear shifter;
   a first hydraulic servo for applying the clutch when fed with an oil pressure;
   a second hydraulic servo for applying the brake when fed with an oil pressure;
   a stopped state detector that detects when the vehicle is stopped;
   a gradient detector that detects the vehicle is on a slope; and
   a controller controlling the oil pressure fed to the first hydraulic servo and the second hydraulic servo, control based on signals from the stopped state detector and the gradient detector, the controller comprising:
   a hydraulic system; and
   an electronic control unit that determines the vehicle is traversing a slope and controls the hydraulic system which comprises:
   at least a control value for reducing oil pressure fed to the first hydraulic servo to substantially release the clutch; and a modulator value for feeding an oil pressure to the second hydraulic servo to apply the brake appropriate to the gradient, the controller executing the reduction of feed oil pressure to the first hydraulic servo by the control valve and feed of regulated oil pressure to the second hydraulic servo by the modulator value when it is detected by the stopped state detector the vehicle is stopped and by the gradient detector the vehicle is on a slope.

10. The control system according to claim 9, further comprising:
   a speed detector;
   a throttle opening detector; and
   a brake engagement detector, wherein the stopped state detector determines the stopped state of the vehicle based on signals from the speed detector, throttle opening detector and the brake engagement detector.

11. The control system according to claim 10, wherein the throttle opening detector is an accelerator pedal detector.

12. The control system according to claim 10, the hydraulic system further comprising a linear solenoid value for raising the fed oil pressure to a higher level for a detected greater slope.

13. The control system according to claim 10, wherein the hydraulic system further comprises:
   a solenoid valve; and
   a neutral relay valve which with the control valve serve to reduce the oil pressure fed to the first hydraulic servo.

14. The control system according to claim 9, wherein the gradient detector detects the gradient load by comparing an actual acceleration while the vehicle is running and a reference acceleration, as computed by the electronic control unit on the basis of an input torque to the gear shifter.

15. The control system according to claim 14, wherein the gradient detector detects the slope if the gear shifter is in a forward range, is not being shifted and if a foot brake pedal of the vehicle is not depressed.

16. The control system according to claim 14, wherein the reference acceleration is computed on the basis of an ideal acceleration of the vehicle, as achieved on a flat road from an input torque to the gear shifter, a gear stage of the gear shifter, and a vehicle speed.

17. A control system according to claim 16, wherein the controller starts the feed of the oil pressure to the second hydraulic servo by the modulator valve, and, after a predetermined time passes, the reduction of the feed oil pressure to the first hydraulic servo by the control valve when it is determined on the basis of signals from the stopped state detector that the vehicle is stopped and the gradient detector that the road is uphill.

* * * * *